United States Patent
Bryant et al.

(10) Patent No.: US 12,222,073 B1
(45) Date of Patent: Feb. 11, 2025

(54) INTERROGATION OF TEMPERATURE SENSITIVE COATINGS ON FUEL TANK EXTERIOR

(71) Applicant: ZeroAvia, Inc., Hollister, CA (US)

(72) Inventors: Parker Bryant, Hollister, CA (US); Arnab Chatterjee, Cirencester (GB); Aritra Dalal, Cirencester (GB)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/641,243

(22) Filed: Apr. 19, 2024

(51) Int. Cl.
F17C 5/06 (2006.01)
F17C 5/00 (2006.01)
G01K 11/125 (2021.01)

(52) U.S. Cl.
CPC ............... *F17C 5/007* (2013.01); *F17C 5/06* (2013.01); *G01K 11/125* (2013.01); *F17C 2221/012* (2013.01); *F17C 2223/0123* (2013.01); *F17C 2250/03* (2013.01); *F17C 2250/0404* (2013.01); *F17C 2250/0636* (2013.01); *F17C 2265/065* (2013.01); *F17C 2270/0171* (2013.01); *F17C 2270/0189* (2013.01)

(58) Field of Classification Search
CPC ...... F17C 2270/0189; F17C 2270/0171; F17C 2265/065; F17C 2250/0636; F17C 2250/0404; F17C 2250/03; F17C 2223/0123; F17C 2221/012; F17C 5/06; F17C 5/007; G01K 11/125
See application file for complete search history.

(56) References Cited

U.S. PATENT DOCUMENTS

| | | | |
|---|---|---|---|
| 5,052,820 A | 10/1991 | McGinniss et al. | 374/131 |
| 5,772,328 A | 6/1998 | Kronberg | 374/162 |
| 6,619,336 B2 * | 9/2003 | Cohen | F17C 13/02 |
| | | | 141/82 |
| 9,279,541 B2 * | 3/2016 | Cohen | F17C 13/026 |
| 9,605,804 B2 | 3/2017 | Mathison | F17C 5/007 |
| 10,030,816 B2 | 7/2018 | Handa | F17C 13/02 |
| 2014/0234739 A1 | 8/2014 | Sachs et al. | H01M 8/0432 |
| 2020/0041358 A1 * | 2/2020 | Alvarez Raventos | G01K 13/08 |

OTHER PUBLICATIONS

Paik et al., "Solution-Processed Phase-Change $VO_2$ Metamaterials from Colloidal Vanadium Oxide ($VO_x$) Nanocrystals" *ACS Nano* 2014, 8, 1, 797-806, Dec. 30, 2013, Abstract only, 19 pages https://pubs.acs.org/doi/10.1021/nn4054446.

* cited by examiner

*Primary Examiner* — Jason K Niesz
(74) *Attorney, Agent, or Firm* — HAYES SOLOWAY P.C.

(57) ABSTRACT

Disclosed is a system for controlling gaseous hydrogen ($GH_2$) refueling of a $GH_2$ vehicle, wherein a vehicle fuel tank is refilled with $GH_2$ from an external supply tank. The system includes a target patch or a cell of a temperature-dependent reflectivity material on an exterior of the vehicle fuel tank, and a sensor package including an electromagnetic (EM) radiation emitter and a radiation detection system positioned remote from the vehicle tank being filled. The sensor package is located on or adjacent an external refueling device with a line of sight to the target patch or cell.

20 Claims, 4 Drawing Sheets

INTERROGATION OF TEMPERATURE SENSITIVE COATINGS ON FUEL TANK EXTERIOR

TECHNICAL FIELD

The present disclosure generally relates to refueling hydrogen fuel-cell-powered vehicles. The disclosure has particular utility in connection with refueling hydrogen fuel-cell-powered aircraft and will be described in connection with such utility, although other utilities are contemplated.

BACKGROUND AND SUMMARY

This section provides background information related to the present disclosure which is not necessarily prior art. This section provides a general summary of the disclosure and is not a comprehensive disclosure of its full scope or all its features.

Exhaust emissions from transport vehicles are a significant contributor to climate change. Conventional fossil-fuel-powered aircraft engines release $CO_2$ emissions. Also, fossil-fuel-powered aircraft emissions include non-$CO_2$ effects due to nitrogen oxide (NOx), vapor trails and cloud formation triggered by the altitude at which aircraft operate. These non-$CO_2$ effects are believed to contribute twice as much to global warming as aircraft $CO_2$ and are estimated to be responsible for two-thirds of aviation's climate impact. Additionally, the high-speed exhaust gases of conventional fossil-fuel-powered aircraft engines contribute significantly to the extremely large noise footprint of commercial and military aircraft, particularly in densely populated areas.

Moreover, in surveillance and defense applications, the high engine noise and exhaust temperatures of conventional fossil fuel burning engines significantly hamper the ability of aircraft to avoid detection and, therefore, reduce the mission capabilities of the aircraft.

Rechargeable battery-powered terrestrial vehicles, i.e., "EVs", are slowly replacing conventional fossil-fuel-powered terrestrial vehicles. However, the weight and limited energy storage of batteries makes rechargeable, battery-powered aircraft generally impractical.

Hydrogen fuel cells offer an attractive alternative to fossil fuel burning engines. Hydrogen fuel cell tanks may be filled relatively quickly and store significant energy, and other than the relatively small amount of unreacted hydrogen gas, the reaction exhaust from hydrogen fuel cells comprises essentially only water.

Advances in gaseous hydrogen ($GH_2$) refueling methods present increased opportunity to reduce fueling times for vehicles while allowing more flexibility in $GH_2$ station designs. Generally, cost reduction, safety and convenience are important factors when designing and building $GH_2$ infrastructure and should be taken into consideration when entering the fuel cell (FC) market.

There are numerous approaches when it comes to developing a $GH_2$ fueling method. For example, a constant pressure ramp rate approach is used in the SAE J2601-2103 table-based approach. The constant pressure ramp rate approach uses fixed inputs or boundary conditions, in conjunction with a fueling model, employing a finite element solution to the heat transfer, thermodynamics, and fluid dynamics, with the output being a target constant pressure ramp rate. Another approach for hydrogen fueling is the Monde Method.

Safety and convenience of $GH_2$ tank refueling are recognized as important considerations in determining the ultimate success of FC-powered vehicles in the marketplace. Under current safety guidelines, refueling of $GH_2$ fuel tanks is to be conducted in a manner that prevents the tank from overheating (temperatures exceeding 85° C.) during refueling and/or from overfilling the tank to a point at which the pressure could exceed 125% of normal working pressure (NWP) at any time. Because of the number of unknown parameters associated with conventional $GH_2$ tank refueling procedures, the refueling operations tend to be somewhat conservative, thereby trading performance and efficiency, particularly with respect to end of fill density or state of charge (SOC %) and/or unnecessary levels of pre-cooling, for an increased safety margin. A SOC of 100%, for example, corresponds to a tank at NWP and 15° C.

This tradeoff is especially significant in non-communication fueling operations in which parametric assumptions are even more conservative. Because a $GH_2$ fueling station does not have information about the tank that it is filling, very conservative assumptions need to be made for the system, in order to encompass the range of possible tank configurations and initial tank conditions, to avoid exceeding system safety limits. In SAE TIR J2601, defined by the Society of Automotive Engineers, the disclosure of which is incorporated herein by reference, in its entirety, these conservative assumptions are incorporated into a series of lookup tables for $GH_2$ tank filling. Working from parameters including tank volume, starting pressure, ambient temperature, and station pre-cooling set point, the lookup tables are used for determining a pressure ramp rate and final target pressure. While application of these lookup tables tends to provide for safe refilling under virtually all conditions and for virtually all tank systems, given the conservative nature of the associated assumptions, the resulting hydrogen tank filling operation may take longer, achieve lower final fill pressures and/or require lower $GH_2$ station pre-cooling temperatures than necessary to fill a particular tank system.

An additional limitation of refilling procedures defined by SAE TIR J2601 is the lack of any method or procedure for a $GH_2$ tank filling station to compensate or adjust for situations in which its actual operating conditions fall outside of the allowed tolerances. For example, if a pre-cooling temperature is above design set point as the result of multiple consecutive refills, the lookup tables defined in SAE TIR J2601 cannot be used. Efforts to avoid this out of specification condition can lead to an overdesigned hydrogen tank filling station (excessive cooling for ensuring that the pre-cooling target temperature is maintained), thereby driving up station cost.

Conversely, failing to ensure that a pre-cooling target temperature is maintained can inconvenience customers who are unable to refill their tanks in a timely manner (as a result of delays waiting for the pre-cooling temperature to come into specification), thereby reducing customer satisfaction, station revenue, and/or repeat business. Further, operating a station with a constant pre-cooling temperature regardless of current ambient conditions results in excessive energy usage and reduced well-to-wheel energy efficiency. In order to reduce energy use, a $GH_2$ tank filling station should be operated at the highest possible pre-cooling temperature that provides both customer-acceptable refueling times and a satisfactory safety margin.

Current $GH_2$ refueling protocols for hydrogen FC-powered aircraft are particularly set to keep the Average Ramp Rate (ARR) conservatively low to ensure that the temperature and pressure of the fuel tank are within safe bounds, so that the aircraft can be refueled between flights where passengers may remain on a plane. This results in relatively long refueling times that make $GH_2$ less competitive with current liquid jet fuels. Also, $GH_2$ refueling storage and compression facilities must be located a significant distance from the vehicle due to conservative deflagration calculations that do not account for technologies that can minimize deflagration risk and affected area, which is farther away than current jet fuel practices and is cumbersome.

The foregoing discussion of the prior art derives primarily from U.S. Pat. No. 9,605,804 (the '804 patent) in which there is described a method for filling a $GH_2$ tank which includes determining a fill time ($t_{final}$) predicted to produce a gas final temperature ($T_{final}$), determining a final pressure ($P_{final}$) calculated to produce a state of charge of 100% within the $GH_2$ tank, and delivering gas to the $GH_2$ tank at a pressure ramp rate (RR) that achieves the final pressure ($P_{final}$) at a conclusion of the fill time ($t_{final}$), wherein the gas is delivered to the $GH_2$ tank using a dispenser.

The method includes determining a fill time ($t_{final}$) predicted to produce a gas final temperature ($T_{final}$) based on one or more coefficients selected from a lookup table, mass average dispenser gas temperature for control (MATC), and alpha, determining a pressure RR, delivering gas to the $GH_2$ tank at a control pressure based on the pressure RR during a first portion of filling the $GH_2$ tank, determining a mass average enthalpy (MAE) and density, and delivering gas to the $GH_2$ tank at a target ending fueling pressure based on the density and the gas final temperature during a second portion of filling the $GH_2$ tank.

According to the '804 patent, the method may include measuring an ambient temperature ($T_{amb}$) and an initial pressure in the $GH_2$ tank ($P_{init}$) and setting an expected end of fill mass average dispenser gas temperature ($MAT_{expected}$). In one or more embodiments, one or more of the coefficients may be selected from the lookup table based on the ambient temperature ($T_{amb}$) and the initial pressure in the $GH_2$ tank ($P_{init}$). One or more of the coefficients may be selected from the lookup table using $T_{amb}$ (above) and $T_{amb}$ (below) values which are directly above and below a corresponding $T_{amb}$ value in the lookup table. $t_{final}$ may be calculated by interpolating between different $t_{final}$ values calculated using $T_{amb}$ (above) and $T_{amb}$ (below). The lookup table may be selected based on a tank category for the $GH_2$ tank.

According to the '804 patent MATC may be calculated based on a time interval, an expected end of fill $MAT_{expected}$, mass average temperature measured from t=0 ($MAT_{M0}$), mass average temperature measured from t=30 ($MAT_{M30}$), or a weighted average of $MAT_{M30}$ and $MAT_{M0}$. The MAE may be calculated as a function of pressure and temperature at a dispenser filling the $GH_2$ tank. The density may be calculated based on the MAE. The method may include a process check and monitoring for one or more stop conditions. One or more of the stop conditions may be based on pressure at the dispenser or temperature at the dispenser.

According to the '804 Patent, the method may include determining a second fill time ($t_{final}$) based on one or more coefficients selected from a second lookup table. The lookup table associated with the fill time may correspond to the first fuel tank category while the second lookup table associated with the second fill time may correspond to a $GH_2$ tank category. The method may include selecting the larger (e.g., more conservative or worst case) of the fill time and the second fill time as the fill time ($t_{final}$). The pressure RR may be determined based on the fill time ($t_{final}$). Further, the pressure RR may be determined based on the equation:

$$RR_{(i)} = \frac{P_{final} - P_{control(i)}}{t_{final(i)} * \left(\frac{P_{final} - P_{initial}}{P_{final} - P_{min}}\right) - t_{(i)}}.$$

The '804 patent also provides a system for filling a $GH_2$ fuel tank which includes a controller and a dispenser having a flow regulator. The controller may determine a fill time ($t_{final}$) predicted to produce a gas final temperature ($T_{final}$) based on one or more coefficients selected from a lookup table of one or more lookup tables, mass average dispenser gas temperature for control (MATC), and alpha. The controller may also determine a pressure RR, a MAE, and density. The dispenser may deliver gas to the $GH_2$ tank at a control pressure based on the pressure RR during the first portion of filling the $GH_2$ tank. The dispenser may deliver gas to the $GH_2$ tank at a target ending fueling pressure based on the density and the gas final temperature during a second portion of filling the $GH_2$ tank.

According to the '804 patent, the system may include an ambient temperature sensor for measuring an ambient temperature ($T_{amb}$), a pressure sensor for measuring a pressure in the $GH_2$ tank ($P_{init}$), a database component having one or more of the lookup tables, each table comprising one or more of the coefficients, wherein respective lookup tables are indicative of one or more tank categories associated with one or more conditions, or a mass flow meter for measuring a flow rate of the delivered gas.

The method and system described in the '804 patent is relatively complex and requires active powered sensors, including a pressure sensor in the $GH_2$ fuel tank, which increases the chance of deflagration during refueling. Active powered sensors designed to mitigate deflagration risk are also more expensive.

In accordance with the present disclosure, we provide a system, i.e., method and apparatus, for gaseous hydrogen ($GH_2$) tank refilling that overcomes the aforesaid and other problems of the prior art. In accordance with our disclosure, we coat the surface of a $GH_2$ tank exterior at least in part with a temperature-dependent reflectivity coating material. The coating material may comprise a thermochromic material or a mechanochromic material. A sensor system remote from the $GH_2$ tank comprising an electromagnetic radiation emitter and a radiation detector is provided remote from the vehicle $GH_2$ tank being filled, and is located on or adjacent an external refueling device with a line of sight to the target patch or cell applied with coating material. The radiation emitter/detector system may be configured to emit and detect radiofrequency (RF), infrared (IR) or other electromagnetic (EM) radiation.

A controller is provided in communication with the sensor and is configured to dynamically adjust refueling flow so that an essentially instantaneous temperature at the tank being filled, as sensed by the radiation emitter/detector system remote from the tank, does not exceed a pre-set maximum.

In one aspect of the present disclosure, we coat an exterior portion of a $GH_2$ tank at least in part with a temperature-dependent reflectivity materials, and remotely interrogate the temperature-sensitive material at or near the refueling device. Preferably, we provide a coating with temperature-dependent reflectivity on at least a portion of a $GH_2$ tank exterior, we direct RF, IR or other EM radiation towards the coating, and we detect reflection from the coating using a remote detector that is positioned on or adjacent an external refueling device. The remote radiation emitting/detection system is positioned to have a line of sight to the coating. A controller is provided in communication with the sensor. The controller is configured to dynamically adjust refueling flow so that the instantaneous temperature at the $GH_2$ tank does not exceed a preset maximum.

Remote temperature sensing along with feedback control allows for higher ARR by enabling dynamic refueling rates that maximize speed while staying within safe parameters, enabling $GH_2$ to realize its full potential as a mobility vector due to fast recharge time. Remote temperature sensing also enables the detection and automatic shutoff of dangerous refueling situations. Additionally, providing unpowered sensors on the refueling vehicle in accordance with the present disclosure allows a vehicle such as an aircraft to be essentially entirely powered off during refueling, which decreases the chance of deflagration and is particularly useful for aviation type certification.

In accordance with the present disclosure, the exterior surface of a cryogenic fuel tank is coated at least in part with a material that changes its reflectivity to an interrogating light beam in response to a temperature of the tank exterior. The coating could be a thermochromic material or a mechanochromic material. Thermochromic materials are materials that change color due to a change in temperature. Different thermochromic materials change color at different temperatures. The temperature at which a thermochromic material changes temperature is referred to as the material's "transition temperature". Similarly, mechanochromic materials are materials that undergo an optical change such as color or transparency when subjected to an external mechanical stimuli such as temperature. Mechanochromic materials can be fluorescent, meaning that they change their emission colors when an external stimuli is applied. As employed in the present disclosure, a change in temperature of the tank exterior will result in a detectable optical change.

The thermochromic or mechanochromic material is interrogated remotely using lasers mounted on or adjacent the refueling vehicle, emitting IR, RF, or optical electromagnetic (EM) light. A change in the temperature of the tank exterior changes reflectance of the coating to the emitted light, which allows for a remote temperature measurement by an unpowered remote detector mounted on or adjacent the refueling vehicle. The thermochromic or mechanochromic material is selected based on an inherent change in reflectance that takes place in the target temperature range that the fuel tank will be within during refueling, typically 0 to 65° C. A preferred thermochromic material comprises tungsten doped vanadium dioxide nano powder available from Nanochemazone, Inc., of Leduc, Alberta, Canada. The thermochromic material has a reversible optical response, changing color at a wavelength of 2500 nm, at 65° C.

In accordance with one embodiment, two or more separated patches or cells of a thermochromic material such as vanadium dioxide, doped with different amounts of tungsten, are coated on an exterior wall of a $GH_2$ tank. Different doping levels of tungsten lead to a change in IR reflectivity at different temperatures as reported by Park et al. "Solution-Powered Phase-Change $VO_2$ Metamaterial from Colloidal Vanadium Oxide ($VO_x$) Nanocrystals", ACE Nano 2014, 8, 1, 797-806, published Dec. 30, 2013, incorporated herein in its entirety by reference.

IR light emitted by an IR light source is directed onto the coated patches or cells, where it is reflected back towards the light source. The reflected IR light is detected by the detector. The detector separately identifies the reflectivity of each cell and uses the cell reflectivities to generate a temperature measurement.

The patches or cells of the thermochromic material or mechanochromic material are designed to provide reflectance changes at various temperatures between 0° C. and 65° C. Reflectance changes between 0° C. to 65° C. are considered important in regard to maintaining fuel tank temperatures at less than 85° C. during refueling to ensure safety.

The sensor package is configured to communicate temperature measurements to a controller. The controller is configured to control the delivery of $GH_2$ from the refueling tank. If an instant temperature measured exceeds a preset maximum, the controller is configured to slow down or shut down refueling. If the temperature measured is cooler than a preset maximum as determined (by the "temperature difference"), the controller is configured to gradually increase fuel flow. In some embodiments, the controller may map adjusting an increase in flow rate and/or a rate of increase in flow rate responsive to a temperature difference and/or rate of change of temperature difference.

More particularly, according to one aspect there is provided a system for controlling gaseous hydrogen ($GH_2$) refueling of a $GH_2$ vehicle, wherein a vehicle fuel tank is refilled with $GH_2$ from an external supply tank, said system comprising a target comprising a patch or a cell of a temperature-dependent reflectivity material on an exterior of the vehicle fuel tank, and a sensor package comprising an electromagnetic (EM) radiation emitter and a radiation detection system positioned remote from the vehicle tank being filled, wherein the sensor package is located on or adjacent an external refueling device with a line of sight to the target patch or cell.

In one embodiment, the radiation emitting, and radiation detection system is configured to emit and detect radiofrequency (RF) radiation or infrared (IR) radiation, or electromagnetic (EM) radiation.

In another embodiment, the temperature-dependent reflectivity material comprises a thermochromic material or a mechanochromic material.

In a further embodiment, the temperature-dependent reflectivity material is applied to a plurality of patches or cells. In such an embodiment the temperature-dependent reflectivity material applied to individual patches or cells of said plurality of patches or cells preferably have different transition temperatures.

In another embodiment the temperature-dependent reflectivity coating material exhibits reflective changes at temperatures between 0° C. and 65° C.

A further embodiment includes a controller configured to control delivery of said $GH_2$ in response to detected changes in reflection of said temperature-dependent reflectivity material.

In yet another embodiment the vehicle comprises a motor vehicle or an aircraft.

In another aspect there is provided a method for controlling refueling of a hydrogen ($H_2$) fuel-cell-powered vehicle, said vehicle having a fuel tank configured to hold a quantity of compressed $GH_2$ from an external filling device, said method comprising providing on an exterior of the vehicle fuel tank a target comprising a patch or cell of a temperature-dependent reflectivity material, interrogating the patch or cell with a radiation emitter and radiation detector system positioned remote from the vehicle tank, and controlling delivery of said GH$_2$ in response to detected changes in reflection of said temperature-dependent reflectivity material.

In one embodiment the radiation emitting and radiation detecting system is configured to emit and detect RF radiation, IR radiation or EM radiation and including the step of directing said RF radiation or IR radiation at the target, and detecting a reflection of said radiation off said target.

In another embodiment the temperature-dependent reflectivity material comprises a thermochromic material or a mechanochromic material.

In a further embodiment the temperature-dependent reflectivity material is applied as a plurality of patches or cells. In such embodiment, individual patches, or cells of said plurality of patches or cells have different transition temperatures.

In a further embodiment, the temperature-dependent reflectivity coating material exhibits transition temperature between 0° C. and 65° C.

In yet another embodiment, there is included a step of retarding a rate of refueling in the event a detected change in reflection of said temperature-dependent reflectivity material exceeds a target.

In still another embodiment, there is included a step of cutting off delivery of GH$_2$ in the event a detected change in reflection of said temperature-dependent reflectivity material exceeds a target.

In yet a further embodiment there is included a step of increasing a rate of refueling in the event a detected change in reflection of said temperature-dependent reflectivity material falls below a target.

In still another embodiment of the method the vehicle is a motor vehicle or an aircraft.

In yet another aspect here is provided an article of manufacture comprising computer readable storage medium storing instructions to cause the GH$_2$ refueling system for a vehicle to: collect data regarding a surface temperature of a fuel tank carried by the vehicle by remotely interrogating the fuel tank using the system as above described; compare said data to a target temperature; and controlling delivery of GH$_2$ to the vehicle on the comparison.

In a preferred embodiment of the article of manufacture, the vehicle comprises a motor or an aircraft.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings.

DETAILED DESCRIPTION

Example embodiments will now be described more fully with reference to the accompanying drawings. Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer, or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
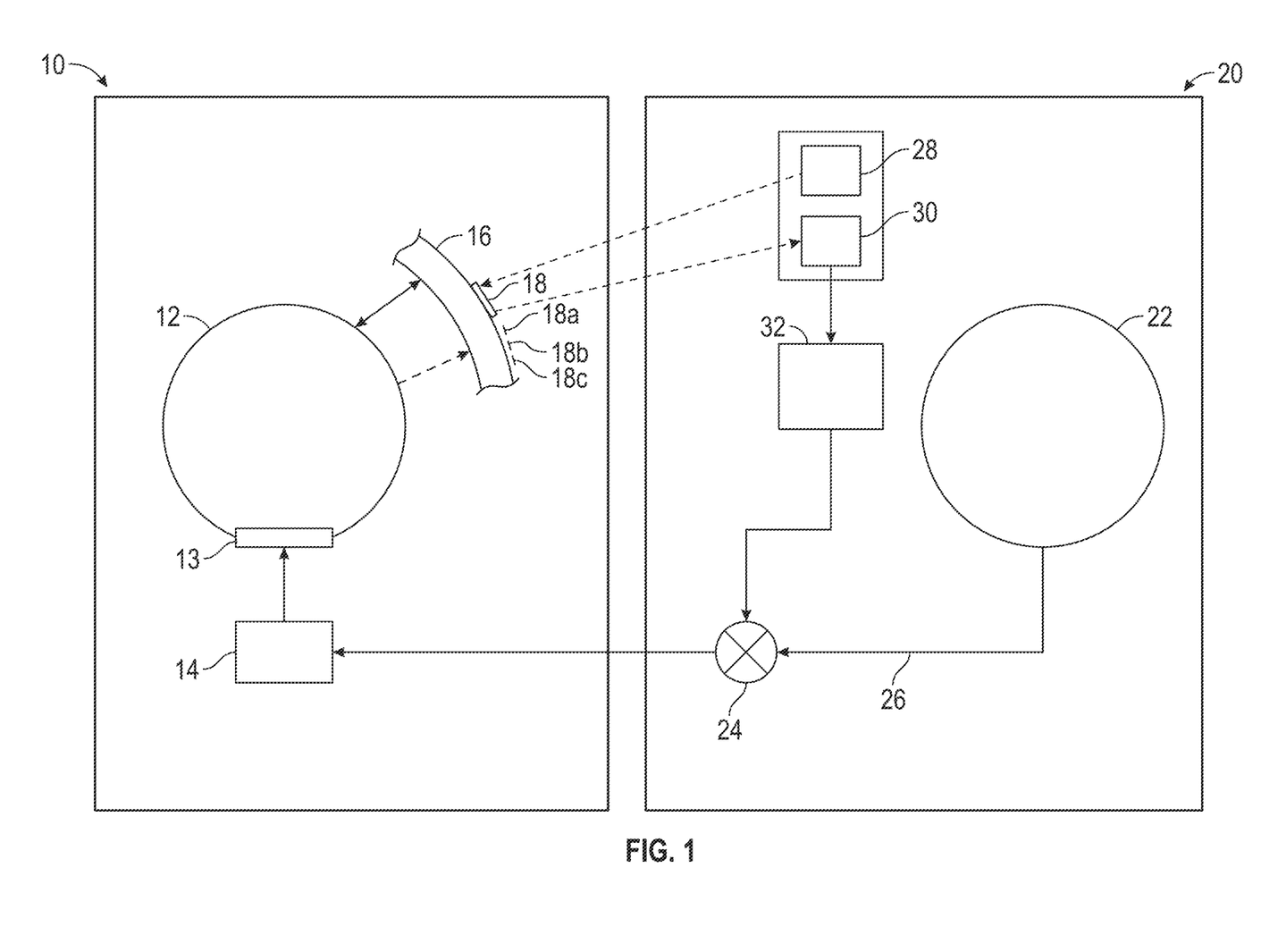
FIG. 1 schematically illustrates an aircraft GH$_2$ refueling system in accordance with the present disclosure.
Figure 2:
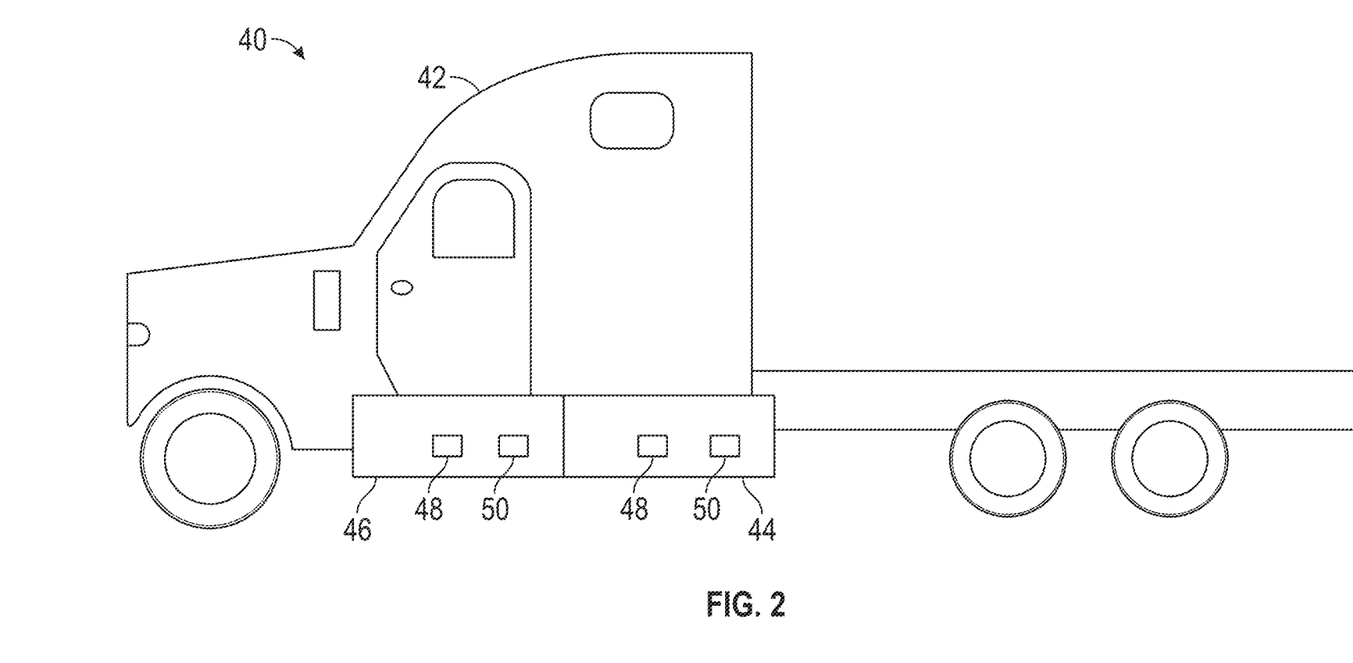
FIG. 2 is a schematic view of a hydrogen FC-powered motor vehicle having fuel tanks with cells coated with thermochromic or mechanochromic material in accordance with the present disclosure.
Figure 3:
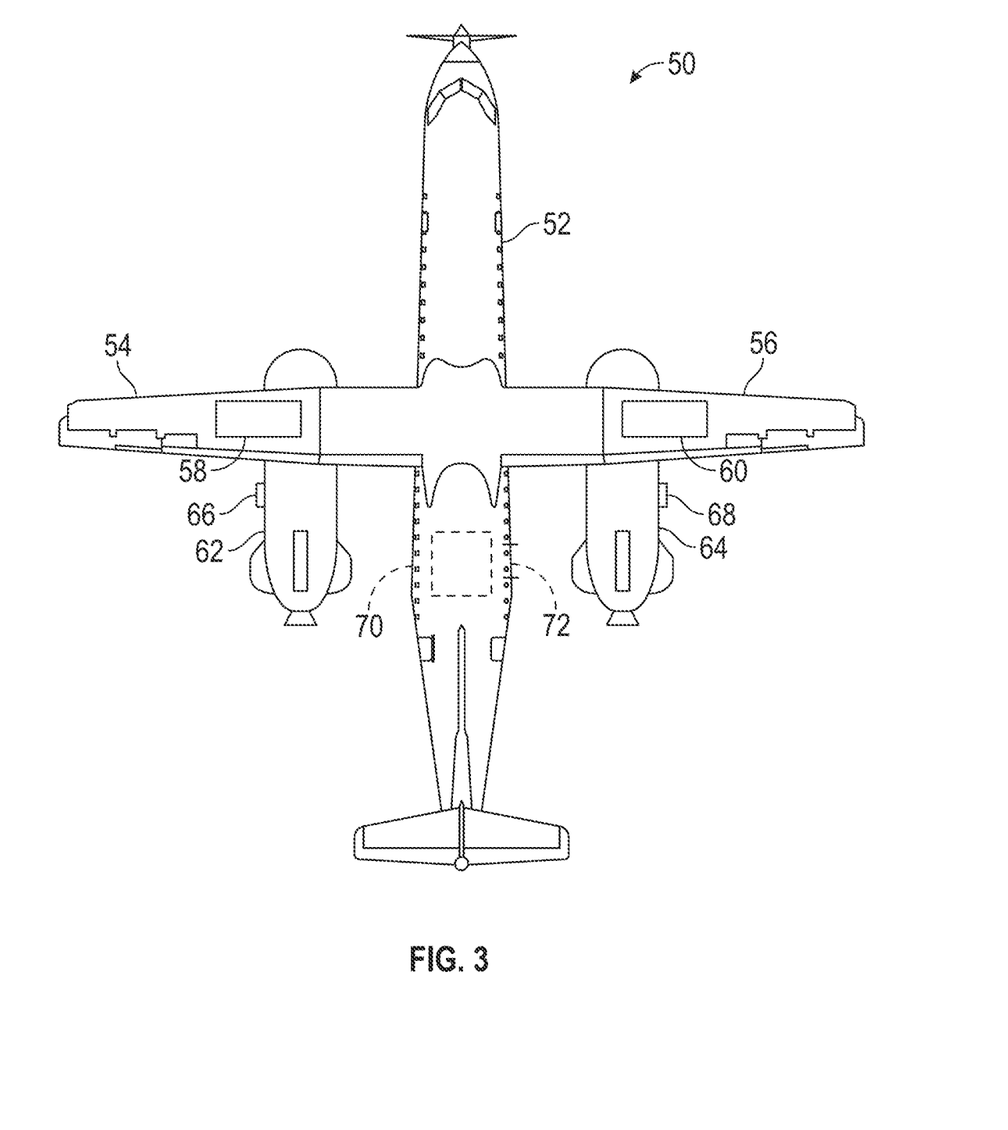
FIG. 3 is a schematic view of a hydrogen FC-powered aircraft having fuel tanks with cells coated with thermochromic or mechanochromic material in accordance with the present disclosure.

In FIG. 1, there is shown a refueling system 10 for refueling a $GH_2$ tank 12 in accordance with the present disclosure. The $GH_2$ tank 12 may be incorporated into a motor vehicle such as a truck as illustrated in FIG. 2, or in an aircraft as illustrated in FIG. 3. Tank 12 includes a closable inlet 13 configured to receive a filling nozzle 14 in a gas tight arrangement. Inlet 13 is a conventional inlet for $GH_2$ tanks and will not be described further.

Outer surface 16 of tank 12 is coated in part with a temperature-dependent reflectivity coating material, i.e., at 18. Temperature-dependent reflectivity coating material comprises a thermochromic material or mechanochromic material chosen to change reflectivity at a pre-determined temperature. In the case of a $GH_2$ tank the predetermined temperature is 65° C. to allow a sufficient margin of safety relative to the 85° C. temperature limit typically imposed on Type IV hydrogen storage tanks. A suitable thermochromic material comprises a coating containing colloidal nanocrystals of tungsten doped vanadium dioxide. Such material is available from Nanochemazone, Inc. of Leduc, Alberta, Canada. Other useful thermochromic or mechanochromic materials useful in the present disclosure include cadmium sulfide.

In a preferred embodiment, the outer surface 16 of tank 12 is coated with a plurality of patches or cells 18a, 18b, 18c of thermochromic material or mechanochromic material, each cell having a different transition temperature.

The refueling station 20 comprises a refueling tank 22 which is connected via a dispenser and flow meter 24 via a conduit 26 to nozzle 14. Refueling station 20 also includes a light source 28 configured to emit EM interrogating radiation of 2500 nm, and a detector 30 configured to detect radiation in the 2450-2550 range. Detector 30 is configured to detect reflection from thermochromic coating 18 and to trigger a signal to controller 32 when reflective light representative of a temperature of 65° C. is sensed. Controller 32 controls dispenser 24 and nozzle 14 to maintain a safe and efficient filling speed.

Referring to FIG. 2 there is illustrated a motor vehicle 40 in accordance with the present disclosure. Motor vehicle 40 comprises a truck 42 powered by hydrogen fuel cells (not shown). Truck 42 includes $GH_2$ fuel tanks 44, 46 which include patches 48, 50 of a thermochromic material coated on exterior walls of tanks 44, 46.

Referring to FIG. 3 there is illustrated an aircraft 50 in accordance with the present disclosure. Aircraft 50 includes a fuselage 52, wings 54, 56, and fuel cells 58, 60 carried within wings 54, 56. $GH_2$ fuel tanks 62, 64 are carried under wings 54, 56, and include patches 66, 68 on exterior surface of the tanks 62, 64 coated with a thermochromic material as above described. Optionally, aircraft 50 may include fuel tank shown in phantom at 70 carried within the fuselage 52. As in the case of tanks 62, 64 tank 70 should include one or a plurality of patches or cells coated with a thermochromic material or a mechanochromic material as above described. When tank 70 is carried within the fuselage, the fuselage should be provided with a trap door or window 72 which is transparent to the interrogating EM radiation and reflection from the thermochromic or mechanochromic material or the tank exterior.

Figure 4:
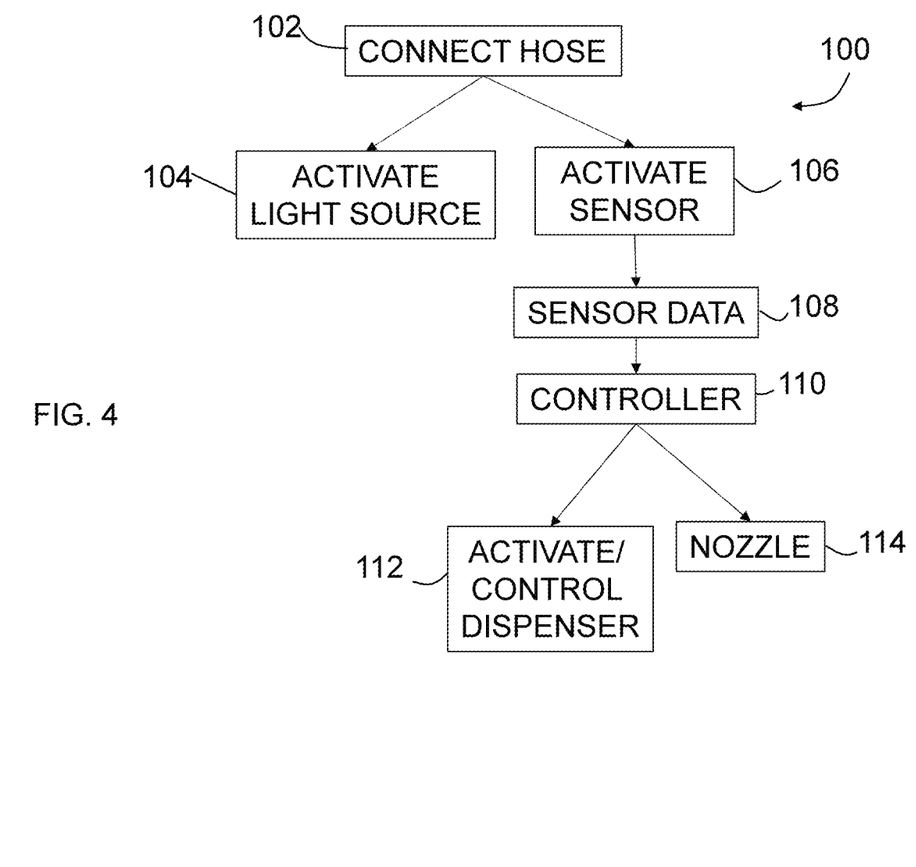
FIG. 4 is a flowchart illustrating a method of controlling refueling of an aircraft with GH$_2$ in accordance with the present disclosure.

Referring to FIG. 4, a $GH_2$ tank refueling system 100 is depicted as a block diagram illustrating various components and modules. The overall process is as follows:

A filling hose is connected between a refueling tank and the vehicle at step 102. Thereafter, a light source is activated at step 104, directed to the coating surface on the tank being filled. A sensor is activated at step 106 and begins to transmit sensor data in step 108 to a controller 110. The $GH_2$ dispenser is activated in step 112, the filling hose nozzle is opened in step 114, and filling is commenced.

Filling continues until the sensor signals an instant temperature rise above 65° C. If an instant temperature exceeds a preset maximum, the controller activates to slow down or shut down the dispenser in step 112 and/or close or partially close nozzle in step 114. If the temperature sensed by the sensor is below a preset target temperature, the controller acts to gradually increase fuel flow by increasing the dispenser speed in step 112 and/or further opening the nozzle in step 114. Filling continues until the tank is full.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A system for controlling gaseous hydrogen ($GH_2$) refueling of a $GH_2$ vehicle, wherein a vehicle fuel tank is refilled with $GH_2$ from an external supply tank, said system comprising an unpowered temperature sensor comprising a patch or a cell of a temperature-dependent reflectivity material on an exterior of the vehicle fuel tank, and a sensor package comprising an electromagnetic radiation emitting system and a radiation detection system positioned remote from the vehicle tank being filled, wherein the sensor package is located on or adjacent an external refueling device with a line of sight to the unpowered temperature sensor patch or cell.

2. The system of claim 1, wherein the radiation emitting system, and the radiation detection system is configured to emit and detect radiofrequency (RF) radiation, infrared radiation (IR) or electromagnetic (EM) radiation.

3. The system of claim 1, wherein the temperature-dependent reflectivity material comprises a thermochromic material or a mechanochromic material.

4. The system of claim 1, wherein the temperature-dependent reflectivity coating material exhibits reflective changes at temperatures between 0° C. and 65° C.

5. The system of claim 1, further comprising a controller configured to control delivery of said $GH_2$ in response to detected changes in reflection of said temperature-dependent reflectivity material.

6. The system of claim 1, wherein the vehicle comprises a motor vehicle or an aircraft.

7. The system of claim 1, wherein the temperature-dependent reflectivity material is applied to a plurality of unpowered temperature sensor patches or cells.

8. The system of claim 7, wherein the temperature-dependent reflectivity material applied to individual unpowered temperature sensor patches or cells of said plurality of unpowered temperature sensor patches or cells have different transition temperatures.

9. An article of manufacture comprising computer readable storage medium storing instructions to cause gaseous hydrogen ($GH_2$) refueling system for a vehicle to:
collect data regarding a surface temperature of a fuel tank carried by the vehicle by remotely interrogating the fuel tank using the system of claim 1;
compare said data to a target temperature; and
controlling delivery of $GH_2$ to the vehicle on the comparison.

10. The article of manufacture of claim 9, the vehicle comprises a motor vehicle or an aircraft.

11. A method for controlling refueling of a hydrogen ($H_2$) fuel-cell-powered vehicle, said vehicle having a fuel tank configured to hold a quantity of compressed $GH_2$ from an external filling device, said method comprising providing on an exterior of the vehicle fuel tank an unpowered temperature sensor comprising a patch or cell of a temperature-dependent reflectivity material, interrogating the unpowered temperature sensor patch or cell with a radiation emitting system and radiation detector system positioned remote from the vehicle tank with a line of sight to the unpowered temperature sensor, and controlling delivery of said $GH_2$ in response to detected changes in reflection of said temperature-dependent reflectivity material.

12. The method of claim 11, wherein the temperature-dependent reflectivity material comprises a thermochromic material or a mechanochromic material.

13. The method of claim 11, wherein the temperature-dependent reflectivity material is applied as a plurality of unpowered temperature sensor patches or cells.

14. The method of claim 13, wherein individual unpowered temperature sensor patches or cells of said plurality of unpowered temperature sensor patches or cells have different transition temperatures.

15. The method of claim 11, wherein the radiation emitting and radiation detecting system is configured to emit and detect RF radiation, IR radiation or electromagnetic (EM) radiation and including the step of directing said RF radiation, IR radiation or electromagnetic (EM) radiation at the unpowered temperature sensor and detecting a reflection of said radiation off said unpowered temperature sensor.

16. The method of claim 15, wherein the temperature-dependent reflectivity coating material exhibits a transition temperature between 0° C. and 65° C.

17. The method of claim 15 including a step of retarding a rate of refueling in the event a detected change in reflection of said temperature-dependent reflectivity material exceeds a target.

18. The method of claim 15 including a step of cutting off delivery of $GH_2$ in the event a detected change in reflection of said temperature-dependent reflectivity material exceeds a target.

19. The method of claim 15 including a step of increasing a rate of refueling in the event a detected change in reflection of said temperature-dependent reflectivity material falls below a target.

20. The method of claim 15, wherein the vehicle is a motor vehicle or an aircraft.

\* \* \* \* \*